(12) United States Patent
Yun et al.

(10) Patent No.: US 9,876,884 B2
(45) Date of Patent: Jan. 23, 2018

(54) ELECTRONIC DEVICE AND METHOD OF WIRELESS SIGNAL TRANSMISSION AND RECEPTION THEREFOR

(71) Applicant: SAMSUNG ELECTRONICS CO., LTD., Suwon-si, Gyeonggi-do (KR)

(72) Inventors: Cheongno Yun, Hwaseong-si (KR); Jungmin Yang, Yongin-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/430,882

(22) Filed: Feb. 13, 2017

(65) Prior Publication Data

US 2017/0237840 A1 Aug. 17, 2017

(30) Foreign Application Priority Data

Feb. 12, 2016 (KR) .......................... 10-2016-0016511

(51) Int. Cl.
*H04M 1/02* (2006.01)
*H01R 24/58* (2011.01)

(52) U.S. Cl.
CPC ............ *H04M 1/026* (2013.01); *H01R 24/58* (2013.01)

(58) Field of Classification Search
CPC ................................. H04M 1/026; H01R 24/58
See application file for complete search history.

(56) References Cited

U.S. PATENT DOCUMENTS

| 8,742,995 | B2 | 6/2014 | Park | |
| 9,608,314 | B1* | 3/2017 | Kwon | ...................... H01Q 5/30 |
| 2012/0121102 | A1* | 5/2012 | Jang | ........................ H04R 1/10 |
| | | | | 381/74 |
| 2017/0150283 | A1* | 5/2017 | Taylor | .................. H04R 29/001 |
| 2017/0153347 | A1* | 6/2017 | Saunders | ............... H01R 24/58 |
| 2017/0201010 | A1* | 7/2017 | Kim | ....................... H01Q 1/243 |

FOREIGN PATENT DOCUMENTS

| KR | 10-2012-0050618 | 5/2012 |
| KR | 10-2012-0097629 | 9/2012 |
| KR | 10-2012-0099900 | 9/2012 |

* cited by examiner

*Primary Examiner* — Edward Urban
*Assistant Examiner* — Max Mathew
(74) *Attorney, Agent, or Firm* — Nixon & Vanderhye, P.C.

(57) ABSTRACT

An electronic device and method of wireless signal transmission and reception therefor are provided. The electronic device may include: a housing having an opening; a connector socket disposed in close proximity to the opening and configured to accommodate an external connector having a plurality of contact terminals through the opening; a ground connected to the connector socket; a codec circuit disposed in the housing and electrically connected with the connector socket; and a communication circuit configured to process a radio signal received from the outside of the electronic device. The connector socket may include a first contact terminal and a second contact terminal that electrically contact one of multiple contact terminals of the external connector when the external connector is inserted into the connector socket. The ground may be electrically connected with the first contact terminal. The codec circuit may include a first port that is electrically connected to the first contact terminal through a first electrical path. The communication circuit may be electrically coupled with the second contact terminal through a second electrical path different from the first electrical path.

20 Claims, 8 Drawing Sheets

ELECTRONIC DEVICE AND METHOD OF WIRELESS SIGNAL TRANSMISSION AND RECEPTION THEREFOR

CROSS-REFERENCE TO RELATED APPLICATION

This application is based on and claims priority under 35 U.S.C. §119 to Korean Patent Application No. 10-2016-0016511, filed in the Korean Intellectual Property Office on Feb. 12, 2016, the disclosure of which is incorporated by reference herein in its entirety.

TECHNICAL FIELD

The present disclosure relates generally to an electronic device and method of wirelessly transmitting and receiving signals therefor.

BACKGROUND

Electronic devices such as smartphones and tablet personal computers are extensively used because they are easy to use and easy to carry. Such an electronic device has a socket (e.g. earphone jack) to which an accessory can be connected.

The electronic device may use an accessory connected to the socket as an antenna. For example, when the earphone plug of an earphone is inserted into the earphone jack of the electronic device, the ground terminal of the earphone may be connected to the communication circuit of the electronic device. At this time, the ground line of the earphone may serve as an antenna. The electronic device may receive a Digital Multimedia Broadcasting (DMB) signal and/or an FM radio signal through the ground line of the earphone.

Meanwhile, the electronic device may include a codec circuit to send and receive an audio signal to and from the earphone. To increase the performance of the earphone (e.g. sound quality), the ground of the earphone may be connected to the ground of the codec circuit in the electronic device.

The electronic device may have a socket (e.g. earphone jack) to which an earphone (e.g. 3 or 4 pole earphone) can be connected or inserted. The electronic device may use the ground terminal of the socket for receiving a radio signal or for extending the ground of the earphone. As the ground terminal of the socket is connected with the ground of the communication circuit and codec circuit, a line may be used in common in the electronic device.

However, the width of the commonly used line should become large to enhance audio performance of the earphone (e.g. low crosstalk); and the width of the commonly used line should become small to enhance radio performance (e.g. impedance matching). Hence, it may be difficult for the electronic device to achieve audio performance and radio performance at the same time. In addition, when the commonly used line becomes long and the socket is placed at the lower end of the electronic device, it may fail to mount a specific component (e.g. inductor), which is to be located at the start point where the path leading to the communication circuit and the path leading to the codec circuit are separated, close to the socket owing to the lack of mounting space. In this case, the electronic device may fail to achieve audio performance and radio performance at the same time.

SUMMARY

Various example aspects of the present disclosure address at least the above mentioned problems and/or disadvantages and provide at least the advantages described below. Accordingly, an example aspect of the present disclosure is to provide an electronic device that can enhance both audio performance and radio performance by replacing the commonly used line with separate lines, and a method of wireless signal transmission and reception therefor.

In accordance with an example aspect of the present disclosure, an electronic device is provided. The electronic device may include: a housing having an opening; a connector socket disposed in proximity to the opening and configured to receive an external connector having a plurality of contact terminals through the opening; a ground connected to the connector socket; a codec circuit disposed in the housing and electrically connected with the connector socket; and a communication circuit configured to process a radio signal received from the outside of the electronic device. The connector socket may include a first contact terminal and a second contact terminal that configured to electrically contact one of multiple contact terminals of the external connector when the external connector is inserted into the connector socket. The ground may be electrically connected with the first contact terminal. The codec circuit may include a first port that is electrically connected to the first contact terminal through a first electrical path. The communication circuit may be electrically coupled with the second contact terminal through a second electrical path different from the first electrical path.

In accordance with another example aspect of the present disclosure, a method for transmitting and receiving radio signals in an electronic device is provided. The method may include: detecting whether an external connector having multiple contact terminals is connected with a connector socket having a first contact terminal and a second contact terminal that are configured to electrically contact one of the contact terminals of the external connector; and electrically connecting, when the external connector is connected with the connector socket, the first contact terminal to a first port of a codec circuit electrically connected with the connector socket through a first electrical path, electrically connecting the second contact terminal to a communication circuit through a second electrical path different from the first electrical path, and causing the communication circuit to receive a radio signal through the second electrical path.

In accordance with another example aspect of the present disclosure, a computer-readable storage medium storing program instructions is provided. The program instructions, when executed, cause one or more processors of an electronic device to detect whether an external connector having multiple contact terminals is connected with a connector socket having a first contact terminal and a second contact terminal that are configured to electrically contact one of the contact terminals of the external connector, to electrically connect, when the external connector is connected with the connector socket, the first contact terminal to a first port of a codec circuit electrically connected with the connector socket through a first electrical path, to electrically connect the second contact terminal to a communication circuit through a second electrical path different from the first electrical path, and to cause the communication circuit to receive a radio signal through the second electrical path.

In a feature of the present disclosure, it is possible to enhance both audio performance and radio performance of an electronic device using, for example, an earphone as an antenna.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
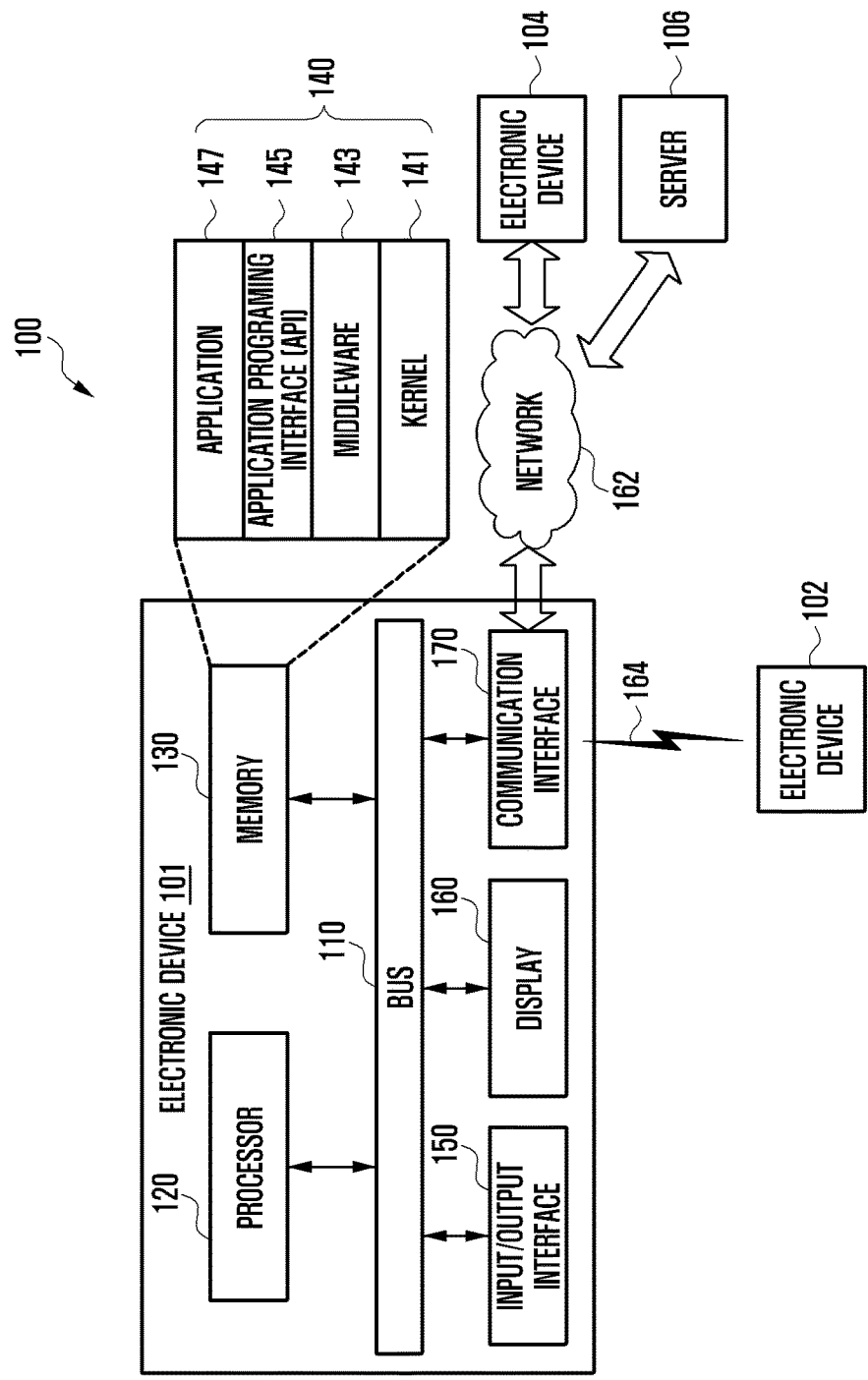
FIG. 1 is a diagram illustrating an example network environment including electronic devices according to various example embodiments of the present disclosure.

The following description is made with reference to the accompanying drawings and is provided to aid in a comprehensive understanding of various example embodiments of the present disclosure as defined by the claims and their equivalents. It includes various details to assist in that understanding but these are to be regarded as merely examples. Accordingly, those of ordinary skill in the art will understand that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may modify various elements. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element. In this disclosure, the expression "configured to" may be used, depending on situations, interchangeably with "adapted to", "having the ability to", "modified to", "made to", "capable of", or "designed to". In some situations, the expression "device configured to" may refer to a situation in which the device may operate with other device(s) or other component(s). For example, the expression "processor configured to perform A, B and C" may refer, for example, to a dedicated processor (e.g., an embedded processor) for performing the above operations, or a general-purpose processor (e.g., central processing unit (CPU) or an application processor (AP)) capable of performing the above operations by executing one or more software programs stored in a memory device.

An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit, or the like, but is not limited thereto. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame, or the like, but is not limited thereto.

In various embodiments of the present disclosure, an electronic device may include at least one of various medical devices (e.g., magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.), or the like, but is not limited thereto. According to a certain embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.), or the like, but is not limited thereto. In various embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating an example network environment 100 including therein an example electronic device 101 in accordance with various example embodiments of the present disclosure.

Referring to FIG. 1, the electronic device 101 may include, but is not limited to, a bus 110, a processor (e.g., including processing circuitry) 120, a memory 130, an input/output interface (e.g., including input/output circuitry) 150, a display 160, and a communication interface (e.g., communication circuitry) 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands.

The processor 120 may include various processing circuitry, such as, for example, and without limitation, a dedicated processor, a CPU, and application specific integrated circuit, a field-programmable gate array, or the like. The processor 120 may also include a detection module including detection circuitry (not shown) to detect whether an external device (e.g. earphone) is connected to the input/output interface 150, an audio module including audio circuitry (not shown) to send and receive an audio signal to and from the external device, and a communication module including communication circuitry (not shown) to process a radio signal sent and received through the external device.

The audio module may include a ground terminal, which may be electrically connected to a first contact terminal of the input/output interface 150 (e.g. ground terminal of the earphone jack). The communication module may be electrically connected to a second contact terminal of the input/output interface 150 (e.g. first detection terminal of the earphone jack), and may send and receive a radio signal. The detection module may be electrically connected to the second contact terminal of the input/output interface 150 (e.g. first detection terminal of the earphone jack) and/or a third contact terminal thereof (e.g. second detection terminal of the earphone jack).

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150 may include various input/output circuitry configured to deliver commands or data, entered by a user through an input/output unit or device (e.g., a sensor, a keyboard, or a touch screen), to the processor 120, the memory 130, or the communication interface 170 via the bus 110.

For example, an external connector having multiple contact terminals may be connected to (inserted into, or mounted on) the input/output interface 150. The external connector may be a part of a 4 pole earphone or balanced earphone. The input/output interface 150 may include first and second contact terminals configured to electrically contact one of contact terminals of the external connector when the external connector is inserted. The first contact terminal may be electrically connected to the ground of the electronic device 101 and the ground terminal of the audio module via a first electrical path. The second contact terminal may be electrically connected to the communication module of the processor 120 via a second electrical path different from the first electrical path. The first detection terminal of the detection module of the processor 120 may be electrically coupled with one side of the second electrical path.

The input/output interface 150 may further include a third contact terminal different from the first contact terminal or the second contact terminal. The third contact terminal may be electrically connected to a second detection terminal of the detection module of the processor 120.

The input/output interface 150 may further include a plurality of contact terminals to send and receive audio signals. For example, the input/output interface 150 may further include a left audio contact terminal to transmit a left audio signal, a right audio contact terminal to transmit a right audio signal, and a microphone contact terminal to receive a microphone signal. In the case of a balanced earphone, the left audio signal may include a positive left audio signal and a negative left audio signal, and the right audio signal may include a positive right audio signal and a negative right audio signal.

In the present disclosure, the input/output interface 150 is not limited to a 4 pole earphone or balanced earphone.

The display module 160 may include, for example, a liquid crystal display (LCD), a light emitting diode (LED) display, an organic LED (OLED) display, a micro electro mechanical system (MEMS) display, or an electronic paper display, or the like, but is not limited thereto. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may include various communication circuitry to establish communication between the electronic device 101 and any external device (e.g., the first external electronic device 102, the second external electronic device 104, or the server 106). For example, the communication interface 170 may be connected with a network 162 through wired or wireless communication 164 and thereby communicate with any external device (e.g., the first external electronic device 102, second external electronic device 104, or the server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure.

The wired communication may include, but not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
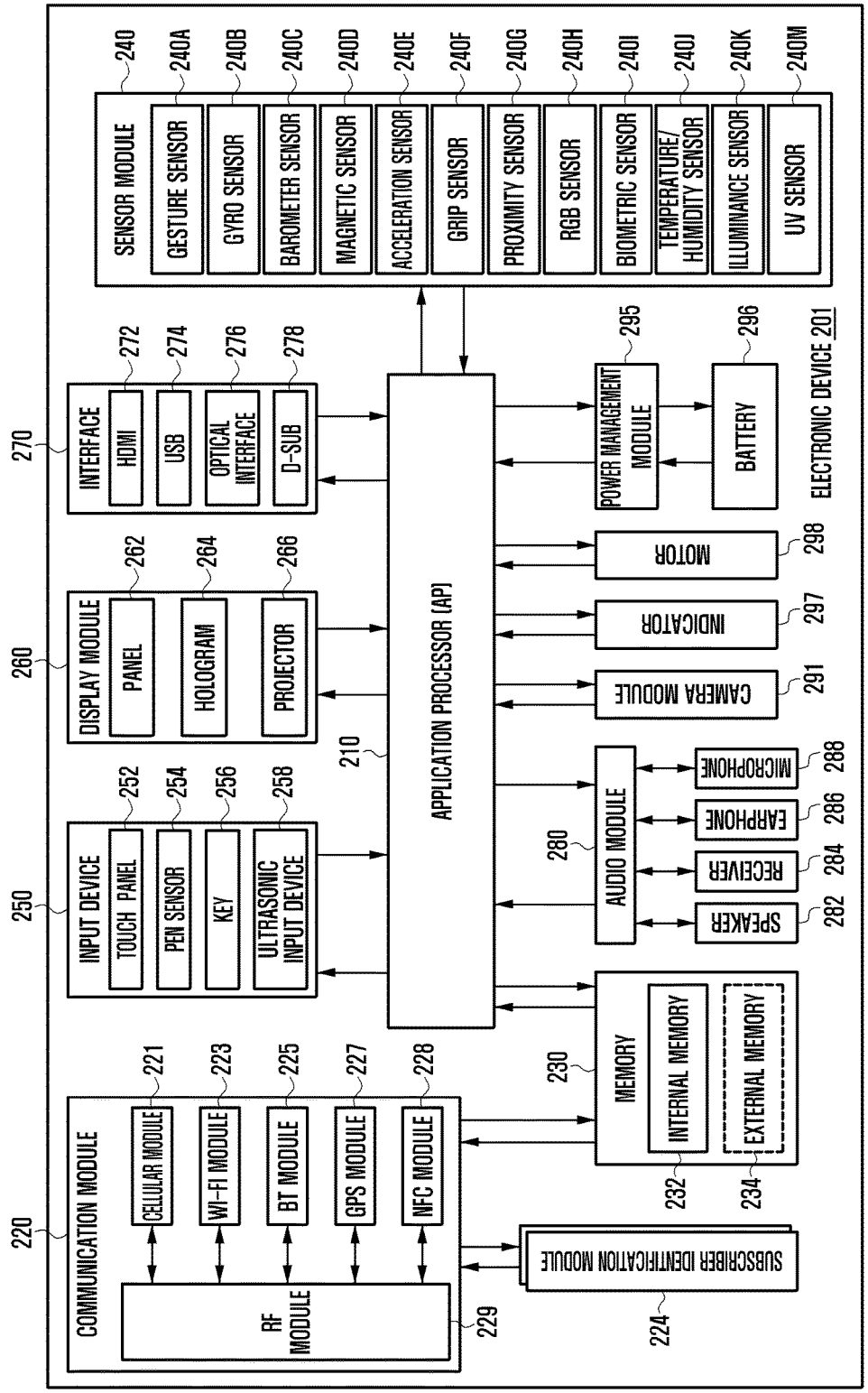
FIG. 2 is a block diagram illustrating an example electronic device according to various example embodiments of the present disclosure.

FIG. 2 is a block diagram illustrating an example electronic device 201 according to various example embodiments of the present disclosure. The electronic device 201 may form, for example, the whole or part of the electronic device 101 shown in FIG. 1.

Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input unit or input device (e.g., including input circuitry) 250, a display or display module 260, an interface (e.g., including interface circuitry) 270, an audio module 280, a camera module 291, a power management module 295, a battery 296, an indicator 297, and a motor 298.

The processor 210 may include various processing circuitry and is capable of driving, for example, an operating system or an application program to control a plurality of hardware or software components connected to the processor 210, processing various data, and performing operations. The processor 210 may be implemented as, for example, a system on chip (SoC). According to an embodiment, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 (e.g., the communication interface 170) may include various communication circuitry configured to perform a data communication with any other electronic device (e.g., the electronic device 104 or the server 106) connected to the electronic device 201 (e.g., the electronic device 101) through the network. According to an embodiment, the communication module 220 may include various communication circuitry, such as, for example, and without limitation, a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an internet service, etc., through a communication network, for example. According to an embodiment, the cellular module 221 is capable of identifying and authenticating an electronic device 201 in a communication network by using a SIM 224 (e.g., a SIM card). According to an embodiment, the cellular module 221 is capable of performing at least part of the functions provided by the processor 210. According to an embodiment, the cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

According to various embodiments, at least part of the cellular module 221, Wi-Fi module 223, BT module 225, GNSS module 227, NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to an embodiment, at least one of the cellular module 221, the Wi-Fi module 223, the BT module 225, the GNSS module 227, and the NFC module 228 is capable of transmission/reception of RF signals through a separate RF module.

The SIM module 224 is capable of including a card including a SIM and/or an embodied SIM. The SIM module 224 is also capable of containing unique identification information, e.g., integrated circuit card identifier (ICCID), or subscriber information, e.g., international mobile subscriber identity (IMSI).

The communication module 220 may further include a DMB module (not shown) to process a video broadcast signal, and an FM module (not shown) to process a radio broadcast signal. The DMB module and the FM module may respectively receive a video broadcast signal and a radio broadcast signal through an external connector (e.g. 4 pole earphone or balanced earphone) connected to the interface 270.

As illustrated in FIG. 2, memory 230 (e.g., memory 103 illustrated in FIG. 1) is capable of including a built-in or internal memory 232 and/or an external memory 234. The built-in or internal memory 232 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The sensor module 240 is capable of measuring/detecting a physical quantity or an operation state of the electronic device 201, and converting the measured or detected information into an electronic signal. The sensor module 240 may include at least one of the following: a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 is capable of further including on or more of the following sensors or operations (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein.

In various embodiments of the present disclosure, the electronic device 201 may include a processor, configured as part of the processor 210 or a separate component, for controlling the sensor module 240. In this case, while the processor 210 is operating in a sleep mode, the processor may include the sensor module 240.

The input device 250 may include various input circuitry, such as, for example, and without limitation, a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 106 shown in FIG. 1) may include a panel 262, a hologram unit or device 264, or a projector 266. The panel 262 may include the same or similar configurations as the display 106 shown in FIG. 1. The panel 262 may be implemented to be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 may include various interface circuitry, such as, for example, and without limitation, an HDMI 272, a USB 274, an optical interface 276, or a D-subminiature (D-sub) 278. The interface 270 may be included in the communication interface 107 illustrated in FIG. 1. Additionally or alternatively, the interface 270 may also include a mobile high-definition link (MHL) interface, an SD card/MMC interface, or an infrared data association (IrDA) standard interface.

The interface 270 may be a connector socket to which an external connector having a plurality of contact terminals can be connected. For example, the interface 270 may be an earphone jack to which a 4 pole earphone or balanced earphone may be connected.

The audio module 280 may convert an audio signal into an electrical signal, and vice versa. At least one component of the audio module 280 may be included in the input/output interface 150 illustrated in FIG. 1. The audio module 280 may process input or output audio data by use of the speaker 282, receiver 284, earphone 286, or microphone 288, etc.

The audio module 280 may include a detection module (not shown) to detect whether an external connector is connected. When an external connector is connected, the audio module 280 may send and receive an audio signal to and from the external connector instead of the speaker 282 or the microphone 288, etc.

The audio module 280 may include a first port (or node) electrically connected with the ground terminal (first contact terminal) of the interface 270 and the ground of the electronic device 101. The first port may be the ground terminal of the audio module 280.

The audio module 280 (e.g. detection module) may include a second port electrically connected with a first detection terminal (second contact terminal) of the interface 270, and may detect the connection of an external connector by use of the second port.

The audio module 280 (e.g. detection module) may include a third port electrically connected with a second detection terminal (third contact terminal) of the interface 270, and may detect the connection of an external connector by use of the third port.

In an example embodiment, the detection module, which has been described above as being included in the audio module 280, may be included in the processor 210.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or MediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
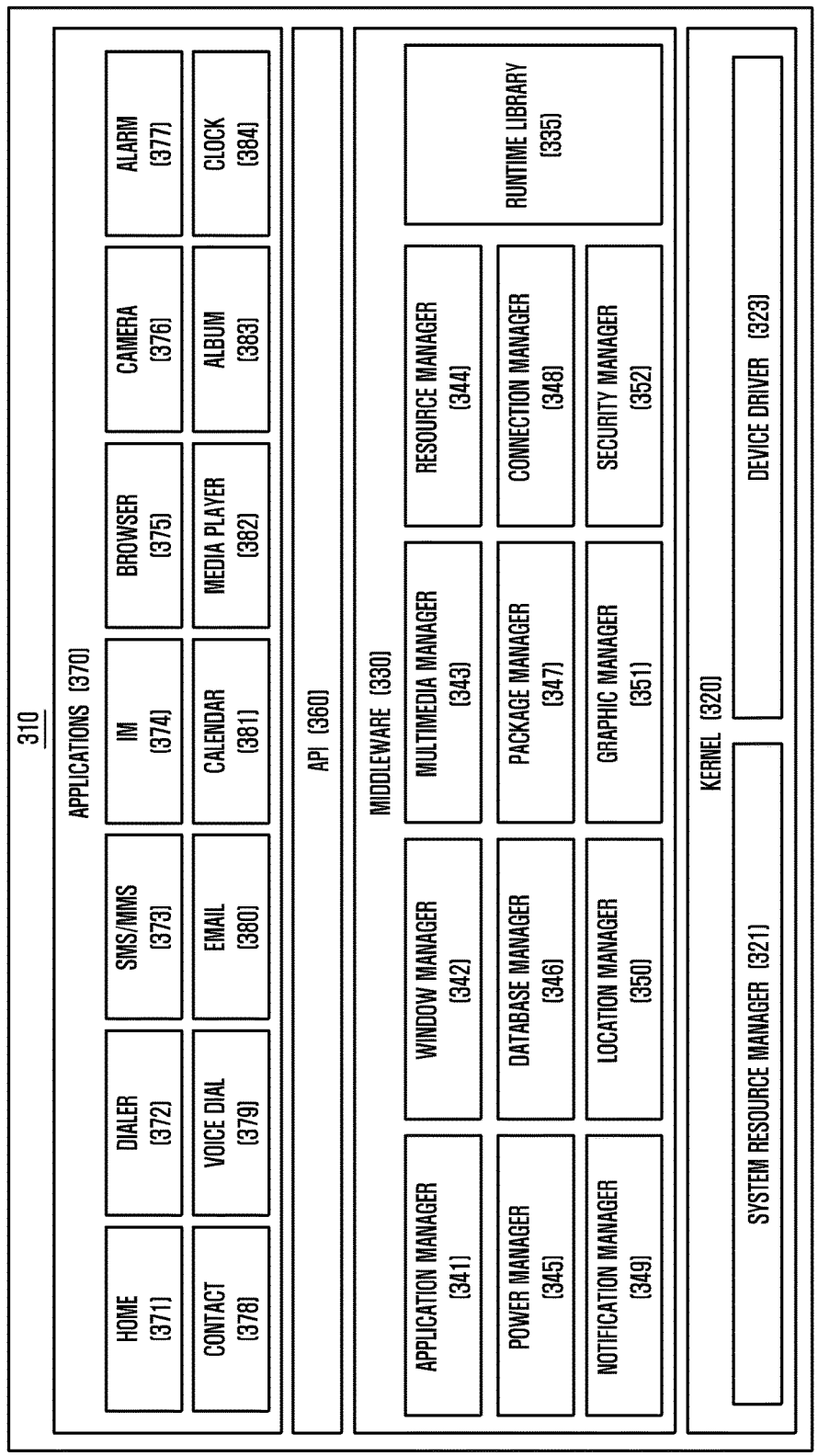
FIG. 3 is a block diagram illustrating an example program module according to various example embodiments of the present disclosure.

FIG. 3 is a block diagram illustrating an example configuration of a programming module 310 according to various example embodiments of the present disclosure.

The programming module 310 may be included (or stored) in the electronic device 100 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a compiler, in order to add a new function by using a programming language during the execution of the application(s) 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
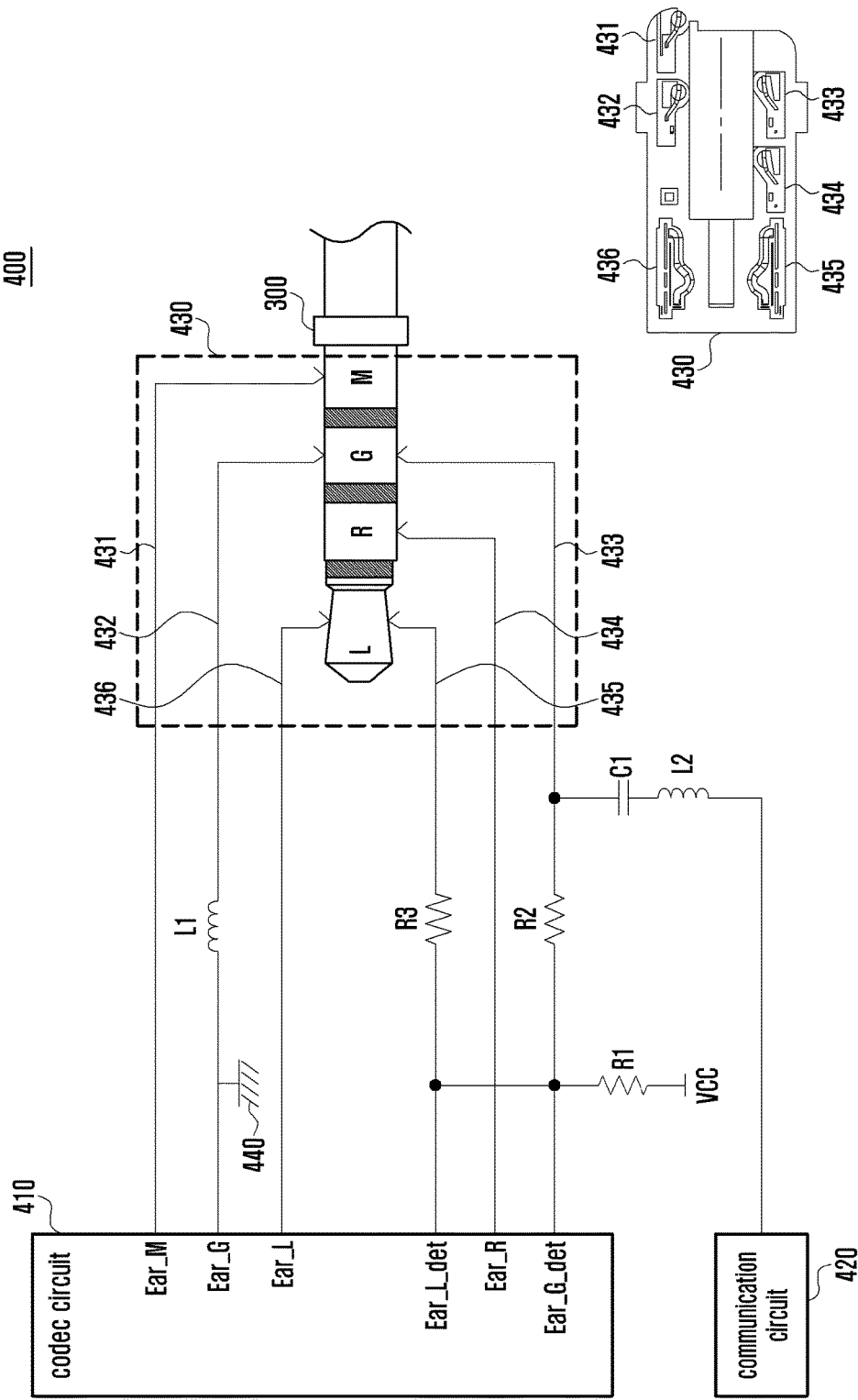
FIG. 4 is a diagram illustrating an example configuration of an example electronic device according to various example embodiments of the present disclosure.
Figure 5:
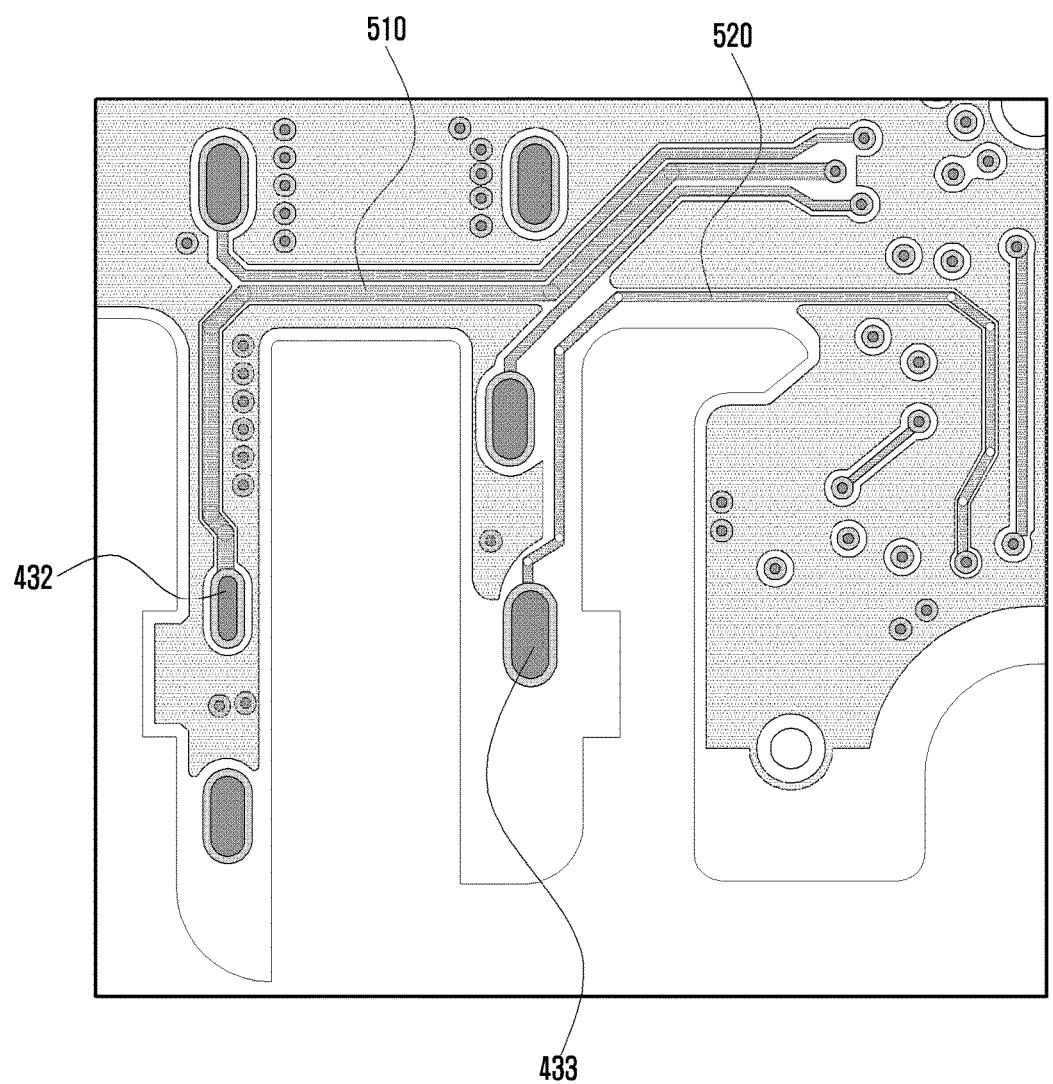
FIG. 5 is a diagram illustrating an example printed circuit board according to various example embodiments of the present disclosure.

FIG. 4 is a diagram illustrating an example configuration of the electronic device according to various example embodiments of the present disclosure, and FIG. 5 is a diagram illustrating an example printed circuit board (PCB) according to various example embodiments of the present disclosure.

Referring to FIGS. 4 and 5, the electronic device 400 (e.g. electronic device 101 or electronic device 201) may include a codec circuit 410, a communication circuit 420, a connector socket 430, and a ground 440.

In an example embodiment, an external connector 300 having multiple contact terminals may be inserted into the connector socket 430 having multiple contact terminals in the electronic device 400. For example, the external connector 300 may be a 4 pole earphone. In this case, the external connector 300 may include a microphone terminal M, a ground terminal G, a right audio terminal R, and a left audio terminal L.

The connector socket 430 may be placed close to the opening formed on the housing of the electronic device 400. The external connector 300 having multiple contact terminals may be seated or inserted in the connector socket 430 through the opening. The connector socket 430 may be an earphone jack into which a 4 pole earphone can be inserted. For example, the connector socket 430 may include a first contact terminal 432 and a second contact terminal 433 which are configured to electrically contact one of multiple contact terminals (e.g. ground terminal G) of the external connector 300 when the external connector 300 is inserted into the connector socket 430. The connector socket 430 may further include a third contact terminal 435 and a fourth contact terminal 436 configured to contact the left audio terminal L of the external connector 300, a fifth contact terminal 434 configured to contact the right audio terminal R of the external connector 300, and a sixth contact terminal 431 configured to contact the microphone terminal M of the external connector 300.

The codec circuit 410 is disposed in the housing of the electronic device 400 and may be electrically connected to the connector socket 430. The codec circuit 410 may include a plurality of ports. For example, the codec circuit 410 may include a first port Ear_G (or ground terminal), second port Ear_G_det (or ground detection terminal), third port Ear_L_det, fourth port Ear_L, fifth port Ear_R, and sixth port Ear_M.

The codec circuit 410 may include a detection circuit to detect the connection of the external connector 300, and an audio circuit to transmit and receive an audio signal to and from the external connector 300. The detection circuit may include the second port Ear_G_det and the third port Ear_L_det. The second port Ear_G_det may be electrically connected to the ground terminal G of the external connector 300 through the second contact terminal 433 of the connector socket 430. The third port Ear_L_det may be electrically connected to the left audio terminal L of the external connector 300 through the third contact terminal 435 of the connector socket 430.

The second port Ear_G_det and the third port Ear_L_det may be connected to the voltage source VCC through a pull-up resistor R1. A first division resistor R2 and a second division resistor R2 may be placed between the second port Ear_G_det and the second contact terminal 433 and between the third port Ear_L_det and the third contact terminal 435, respectively.

In an example embodiment, the detection circuit of the codec circuit 410 may include the third port Ear_L_det only. The detection circuit may be configured as a separate entity or included in a different component (e.g. processor 120 or 210, or power management module 295).

The audio circuit of the codec circuit 410 may include the first port Ear_G, fourth port Ear_L, fifth port Ear_R, and sixth port Ear_M. The first port Ear_G is electrically connected with the first contact terminal 432 of the connector socket 430 and the ground 440, and may be electrically connected to the ground terminal G of the external connector 300 through the first contact terminal 432 of the connector socket 430. For example, the first contact terminal 432 and the first port Ear_G may be electrically connected using a first electrical path, and the ground 440 may be electrically connected with one side of the first electrical path.

A first inductance element (e.g. choke inductor L1) may be placed between the ground 440 and the first contact terminal 432 to prevent a radio signal received through the external connector 300 from being induced to the first port Ear_G.

The first port Ear_G and the first inductance element L1 (or, the first contact terminal 432 if the first inductance element L1 is not present) may be connected directly or indirectly through the ground 440.

The fourth port Ear_L may be electrically connected with the left audio terminal L of the external connector 300 through the fourth contact terminal 436 of the connector socket 430. The fifth port Ear_R may be electrically connected with the right audio terminal R of the external connector 300 through the fifth contact terminal 434 of the connector socket 430. The sixth port Ear_M may be electrically connected with the microphone terminal M of the external connector 300 through the sixth contact terminal 431 of the connector socket 430.

The communication circuit 420 may send and receive radio signals. For example, the communication circuit 420 may send and receive a radio signal through the external connector 300 connected to the connector socket 430. One constituent (e.g. ground line) of the external connector 300 may serve as an antenna for the communication circuit 420.

The communication circuit 420 may be electrically connected with the second contact terminal 433 of the connector socket 430 through a second electrical path different from the first electrical path. A DC-blocking element (e.g. capacitor C1) may be placed between the communication circuit 420 and the second contact terminal 433 to block supply of DC power (e.g. Vcc) to the communication circuit 420. A second inductance element (e.g. inductor L2) may be placed between the DC-blocking element C1 and the communication circuit 420 to reduce high-frequency noise. The DC-blocking element C1 and the second inductance element L2 may perform a filter function.

The communication circuit 420 may include a DMB module (not shown) to process a video broadcast signal and/or an FM module (not shown) to process a radio broadcast signal.

In various embodiments, referring to FIG. 5, there may be a first electrical path 510 between the first contact terminal 432 and the first port Ear_G, and a second electrical path 520 between the second contact terminal 433 and the communication circuit 420. There is no line common to the first electrical path 510 and the second electrical path 520. As the first electrical path 510 does not affect radio performance of the communication circuit 420, the line width may become larger. As the second electrical path 520 does not affect the ground of the codec circuit 410, the line width may become smaller for impedance matching. The second electrical path 520 may share a line with the second port Ear_G_det. However, as the second port Ear_G_det has only to sense a voltage change caused by the connection of the external connector 300, it may be not affected by the line width. In the present disclosure, the width of the line commonly used by the connector socket 430 and the second port Ear_G_det shown in FIG. 4 may be adjusted (e.g. decreased) for impedance matching. Hence, the electronic device 400 may achieve both audio performance and radio performance.

In an example embodiment, although not illustrated in FIG. 4, the electronic device 400 may further include various components, such as a digital sound player module like an MP3 module, short-range communication module, and a sensor module including an illuminance sensor, motion sensor, fingerprint recognition sensor, and infrared sensor. The electronic device 400 may further include a component or unit comparable to the above-described modules.

According to various embodiments of the present disclosure, an electronic device (e.g. electronic device 400, 600 or 700) may include: a housing having an opening; a connector socket (e.g. connector socket 430, 630 or 730) placed close to the opening and configured to accommodate an external connector (e.g. external connector 300) having a plurality of contact terminals through the opening; a ground (e.g. ground 440, 640) connected to the connector socket; a codec circuit (e.g. codec circuit 410, 610 or 710) placed in the housing and electrically connected with the connector socket; and a communication circuit (e.g. communication circuit 420, 620 or 720) to process a radio signal received from the outside of the electronic device. The connector socket may include a first contact terminal (e.g. first contact terminal 432) and a second contact terminal (e.g. second contact terminal 433) that are placed so as to electrically contact one of multiple contact terminals of the external connector when the external connector is inserted into the connector socket. The ground may be electrically connected with the first contact terminal. The codec circuit may include a first port (e.g. first pot Ear_G) that is electrically connected to the first contact terminal through a first electrical path. The communication circuit may be electrically coupled with the second contact terminal through a second electrical path different from the first electrical path.

In an example embodiment, the codec circuit may include a second port electrically connected to one side of the second electrical path, and may use the second port to detect whether one of multiple contact terminals of the external connector comes into contact with the second contact terminal of the connector socket.

In an example embodiment, the second port may be a ground detection terminal of the codec circuit.

In an example embodiment, the codec circuit may include a detection circuit to detect the connection of the external connector.

In an example embodiment, the first port may be a ground terminal of the codec circuit.

In an example embodiment, the connector socket may further include a third contact terminal different from the first contact terminal or the second contact terminal. The codec circuit may further include a third port to detect whether one of the contact terminals of the external connector comes into contact with the third contact terminal of the connector socket.

In an example embodiment, the electronic device may further include a first inductance element placed between the first contact terminal and the ground.

In an example embodiment, the electronic device may further include a DC-blocking element placed between the communication circuit and the second contact terminal.

In an example embodiment, the electronic device may further include a second inductance element placed between the DC-blocking element and the communication circuit.

In an example embodiment, the first contact terminal and the second contact terminal of the connector socket may each be connected with the ground terminal of the external connector.

In an example embodiment, the connector socket may be a 4 pole earphone jack or a balanced earphone jack.

In an example embodiment, the line width of the first electrical path may be larger than that of the second electrical path.

In an example embodiment, the connector socket may be placed at a lower end portion of the electronic device.

In an example embodiment, the connector socket may be mounted on a sub PCB separate from a main PCB on which the communication circuit and the codec circuit are mounted.

In an example embodiment, the communication circuit may receive and process a Digital Multimedia Broadcasting (DMB) signal or a Frequency Modulation (FM) radio signal.

Figure 6:
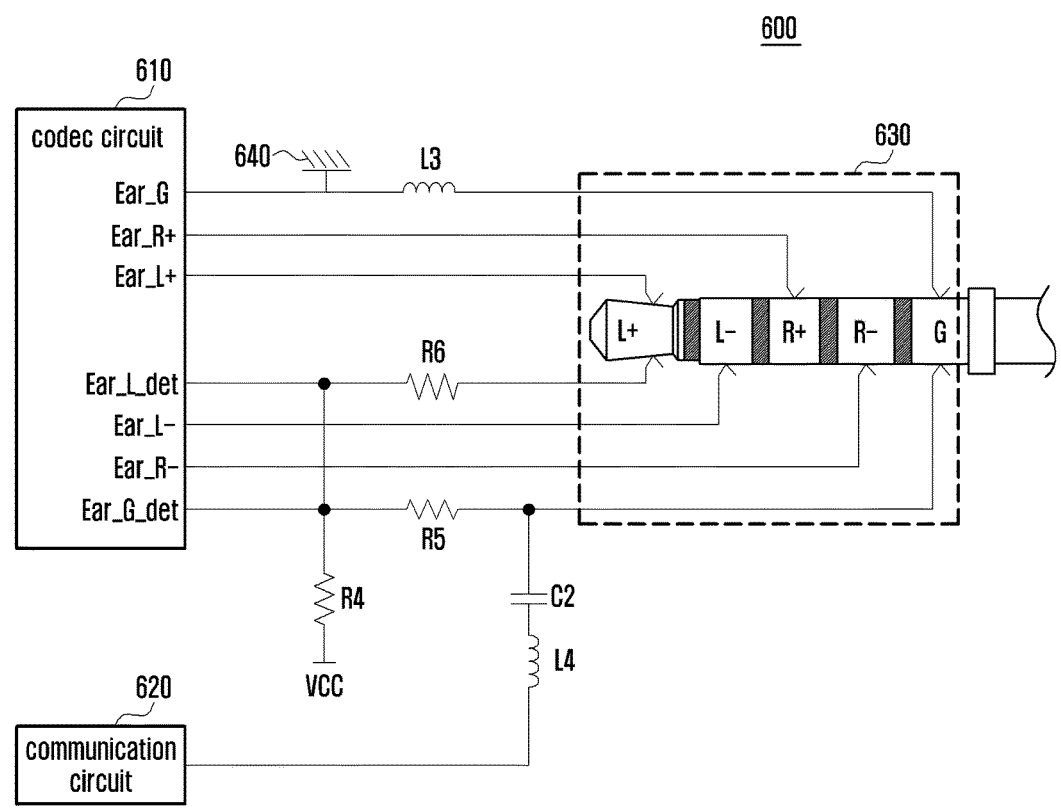
FIG. 6 is a diagram illustrating an example configuration of an example electronic device according to various example embodiments of the present disclosure.

FIG. 6 illustrates an example configuration of an example electronic device according to various example embodiments of the present disclosure.

Referring to FIG. 6, the electronic device 600 may include a codec circuit 610, a communication circuit 620, a connector socket 630, and a ground 640.

The configuration of the electronic device 600 may be similar to that of the electronic device 400 of FIG. 4 except that the external connector is a part of a balanced earphone and the connector socket 630 is an earphone jack for the balanced earphone.

The balanced earphone may have two right audio terminals Ear_R+ and Ear_R−, two left audio terminals Ear_L+ and Ear_L−, and a ground terminal G. The codec circuit 610 may have a first port Ear_G, second port Ear_G_det, third port Ear_L_det, fourth port Ear_R+, fifth port Ear_R−, sixth port Ear_L+, and seventh port Ear_L−.

In an example embodiment, the electronic device 600 may include a first contact terminal and a second contact terminal that are placed so as to electrically contact one of multiple contact terminals of the balanced earphone when the balanced earphone is inserted into the connector socket 630. The first contact terminal may be connected with the first port Ear_G of the codec circuit 610 through a first electrical path. The ground 640 may be electrically coupled with one side of the first electrical path. The second contact terminal may be connected to the communication circuit 620 through a second electrical path. The second port Ear_G_det of the codec circuit 610 may be electrically coupled with one side of the second electrical path. The other elements (R4, R5, R6, L3, L4, C2, and Ear_L_det) of FIG. 6 are similar respectively to those elements (R1, R2, R3, L1, L2, C1, Ear_L_det) of FIG. 4, and a detailed description thereof is omitted.

Figure 7:
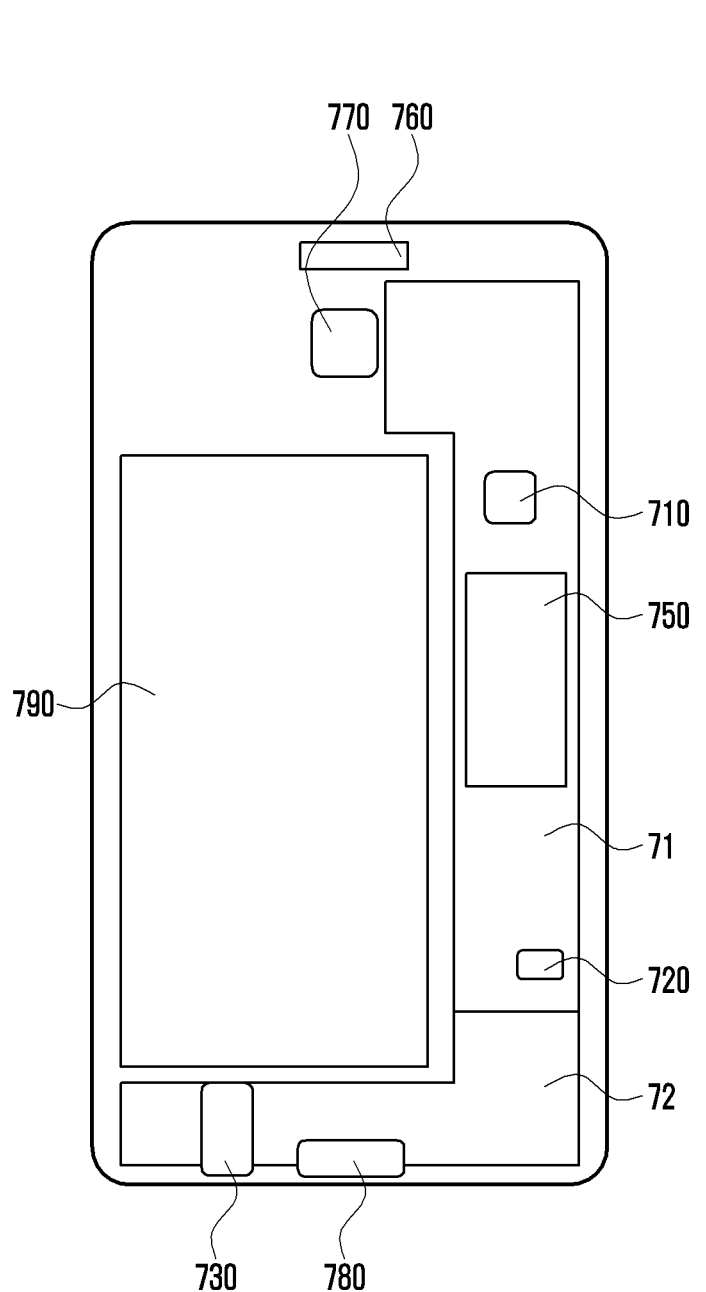
FIG. 7 is a diagram illustrating an example electronic device according to various example embodiments of the present disclosure.

FIG. 7 is a diagram illustrating an example electronic device according to various example embodiments of the present disclosure.

Referring to FIG. 7, the electronic device 700 may include a main printed circuit board (PCB) 71, a sub PCB 72 separate from the main PCB 71, a camera 770, a speaker 760, and a battery 790. On the main PCB 71, the codec circuit 710, processor 750, and communication circuit 720 may be mounted. On the sub PCB 72, an interface terminal 780 for charging and communication and the connector socket 730 for connecting an external connector may be mounted.

The connector socket 730 may be placed at a lower end portion of the electronic device 700. For example, the connector socket 730 may be placed next to the interface terminal 780. When a shared line is used while the connector socket 730 is separated far from the communication circuit 720 and the codec circuit 710 as shown in FIG. 7, it may be very difficult for the electronic device to achieve audio performance and radio performance at the same time. However, in the present disclosure, as separate lines are used, it is possible to achieve audio performance and radio performance at the same time although the connector socket 730 is placed at a lower end portion of the electronic device 700.

Figure 8:
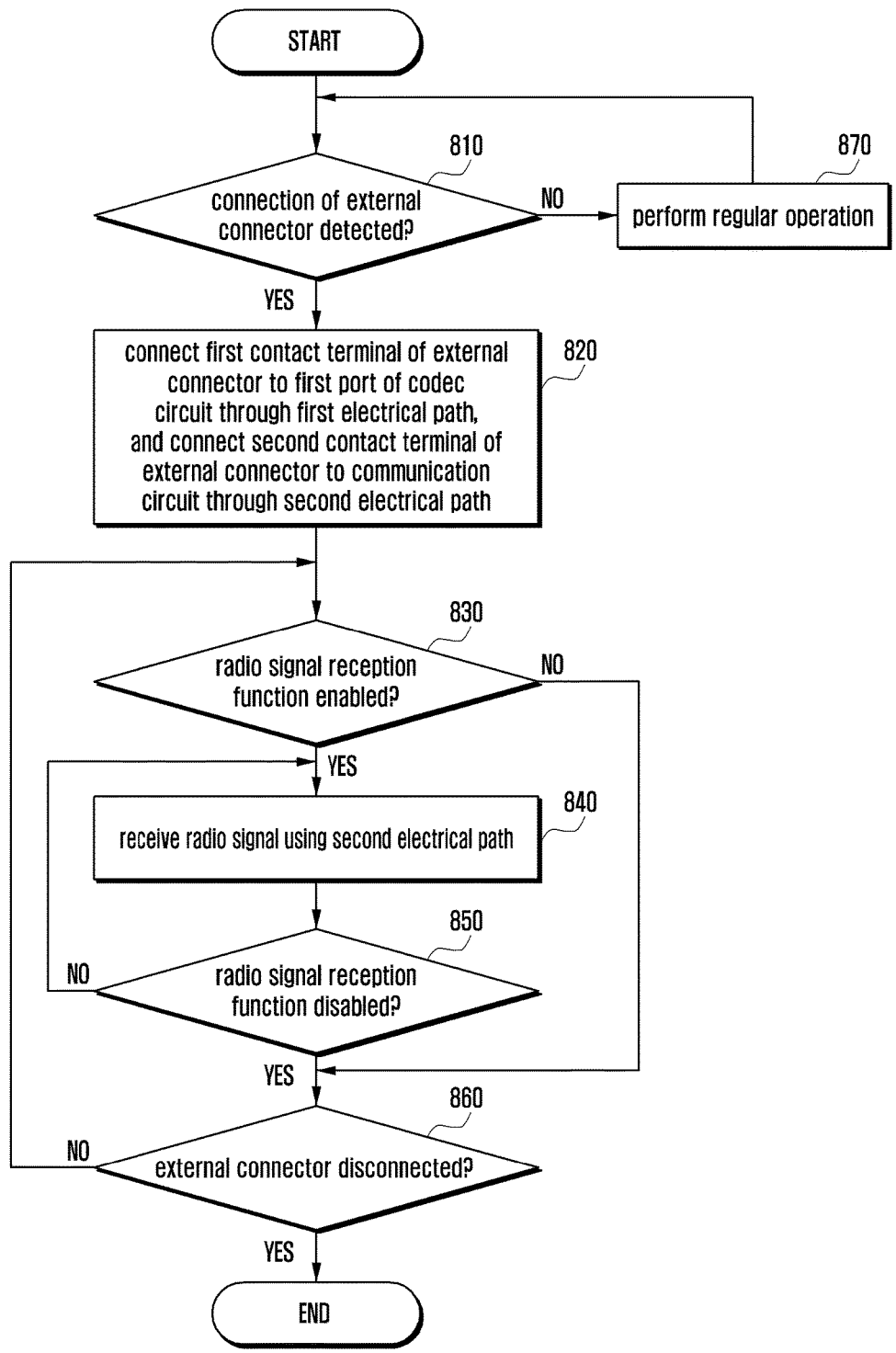
FIG. 8 is a flowchart illustrating an example method for the electronic device to receive a radio signal according to various example embodiments of the present disclosure.

FIG. 8 is a flowchart illustrating an example method for the electronic device to receive a radio signal according to various example embodiments of the present disclosure.

Referring to FIG. 8, at step 810, the electronic device (e.g. electronic device 101 of FIG. 1, electronic device 201 of FIG. 2, electronic device 400 of FIG. 4, electronic device 600 of FIG. 6, or electronic device 700 of FIG. 7) detects whether an external connector is connected. For example, the codec circuit of the electronic device may detect the connection of an external connector by use of at least one of the second port Ear_G_det and the third port Ear_L_det illustrated in FIG. 4 or 6.

When an external connector is not connected, at step 870, the electronic device may perform a regular operation. For example, the electronic device may play music or access the Internet according to a user request, or may remain in the standby state.

When an external connector is connected, at step 820, contact terminals of the external connector are brought into contact with corresponding contact terminals of the connector socket. For example, a first contact terminal of the external connector and a first port of the codec circuit may be connected together through a first electrical path, and a second contact terminal of the external connector and the communication circuit may be connected together through a second electrical path different from the first electrical path.

At step 830, the electronic device determines whether the radio signal reception function is enabled (for, e.g., DMB video broadcast or FM radio broadcast). When the radio signal reception function is not enabled (off), the procedure proceeds to step 860. When the radio signal reception function is enabled (on), at step 840, the electronic device receives a radio signal by use of the second electrical path.

At step 850, the electronic device determines whether the radio signal reception function is disabled (off). When the radio signal reception function is not disabled (on), the procedure returns to step 840.

When the radio signal reception function is disabled (off), at step 860, the electronic device determines whether the external connector is disconnected. When the external connector is not disconnected, the procedure returns to step 830. When the external connector is disconnected, the electronic device ends radio signal reception through the external connector. Although only radio signal reception using the second electrical path is described in FIG. 8, the electronic device may use the second electrical path to transmit a radio signal or to transmit and receive a radio signal in another embodiment.

According to various example embodiments of the present disclosure, a method for transmitting and receiving radio signals in an electronic device may include: detecting whether an external connector having multiple contact terminals is connected with a connector socket having a first contact terminal and a second contact terminal that are configured to electrically contact one of the contact terminals of the external connector; and electrically connecting, when the external connector is connected with the connector socket, the first contact terminal to a first port of a codec circuit electrically connected with the connector socket through a first electrical path, electrically connecting the second contact terminal to a communication circuit through a second electrical path different from the first electrical path, and causing the communication circuit to receive a radio signal through the second electrical path.

In an example embodiment, detecting whether an external connector is connected with a connector socket may include causing a second port of the codec circuit electrically connected with one side of the second electrical path to detect whether one of the contact terminals of the external connector comes into contact with the second contact terminal of the connector socket.

In an example embodiment, detecting whether an external connector is connected with a connector socket may include causing a third port of the codec circuit electrically connected with a third contact terminal different from the first contact terminal or the second contact terminal to detect whether one of the contact terminals of the external connector comes into contact with the third contact terminal.

In an example embodiment, the method may further include causing the communication circuit to transmit a radio signal through the second electrical path.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of a dedicated processor, a CPU, an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

According to various example embodiments of the present disclosure, a computer-readable storage medium may store instructions that, when executed, cause one or more processors of an electronic device perform operations including to detect whether an external connector having multiple contact terminals is connected with a connector socket having a first contact terminal and a second contact terminal that are configured to electrically contact one of the contact terminals of the external connector, to electrically connect, when the external connector is connected with the connector socket, the first contact terminal to a first port of a codec circuit electrically connected with the connector socket through a first electrical path, to electrically connect the second contact terminal to a communication circuit through a second electrical path different from the first electrical path, and to cause the communication circuit to receive a radio signal through the second electrical path.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing having an opening;
a connector socket disposed in proximity to the opening and configured to accommodate an external connector having multiple contact terminals through the opening;
a ground connected to the connector socket;
a codec circuit disposed in the housing and electrically connected with the connector socket; and
a communication circuit configured to process a radio signal received from the outside of the electronic device,
wherein the connector socket includes a first contact terminal and a second contact terminal that electrically contact one of the contact terminals of the external connector when the external connector is inserted into the connector socket,
wherein the ground is electrically connected with the first contact terminal,
wherein the codec circuit includes a first port electrically connected to the first contact terminal through a first electrical path,
wherein the communication circuit is electrically coupled with the second contact terminal through a second electrical path different from the first electrical path.

2. The electronic device of claim 1, wherein the codec circuit includes a second port electrically connected to one side of the second electrical path, and is configured to use the second port to detect whether one of the contact terminals of the external connector is in contact with the second contact terminal of the connector socket.

3. The electronic device of claim 2, wherein the second port comprises a ground detection terminal of the codec circuit.

4. The electronic device of claim 2, wherein the codec circuit includes a detection circuit configured to detect the connection of the external connector.

5. The electronic device of claim 1, wherein the first port comprises a ground terminal of the codec circuit.

6. The electronic device of claim 1, wherein the connector socket further comprises a third contact terminal different from the first contact terminal and the second contact terminal, wherein the codec circuit further includes a third port configured to detect whether one of the contact terminals of the external connector is in contact with the third contact terminal of the connector socket.

7. The electronic device of claim 1, further comprising a first inductor connected between the first contact terminal and the ground.

8. The electronic device of claim 1, further comprising a DC-blocking circuit element connected between the communication circuit and the second contact terminal.

9. The electronic device of claim 8, further comprising a second inductor connected between the DC-blocking circuit element and the communication circuit.

10. The electronic device of claim 1, wherein the first contact terminal and the second contact terminal of the connector socket contact the ground terminal of the external connector.

11. The electronic device of claim 1, wherein the connector socket includes one of: a 4 pole earphone jack or a balanced earphone jack.

12. The electronic device of claim 1, wherein a line width of the first electrical path is larger than a line width of the second electrical path.

13. The electronic device of claim 1, wherein the connector socket is disposed at a lower end portion of the electronic device.

14. The electronic device of claim 13, wherein the connector socket is mounted on a sub PCB separate from a main PCB on which the communication circuit and the codec circuit are mounted.

15. The electronic device of claim 1, wherein the communication circuit is configured to receive and process a Digital Multimedia Broadcasting (DMB) signal or a Frequency Modulation (FM) radio signal.

16. A method for transmitting and receiving radio signals in an electronic device, the method comprising:
    detecting whether an external connector having multiple contact terminals is connected with a connector socket having a first contact terminal and a second contact terminal that are configured to electrically contact one of the contact terminals of the external connector; and
    electrically connecting, when the external connector is connected with the connector socket, the first contact terminal to a first port of a codec circuit electrically connected with the connector socket through a first electrical path, electrically connecting the second contact terminal to a communication circuit through a second electrical path different from the first electrical path, and causing the communication circuit to receive a radio signal through the second electrical path.

17. The method of claim 16, wherein detecting whether an external connector is connected with a connector socket comprises causing a second port of the codec circuit electrically connected with one side of the second electrical path to detect whether one of the contact terminals of the external connector is in contact with the second contact terminal of the connector socket.

18. The method of claim 16, wherein detecting whether an external connector is connected with a connector socket comprises causing a third port of the codec circuit electrically connected with a third contact terminal different from the first contact terminal or the second contact terminal to detect whether one of the contact terminals of the external connector is in contact with the third contact terminal.

19. The method of claim 16, further comprising causing the communication circuit to transmit a radio signal through the second electrical path.

20. A non-transitory computer-readable storage medium storing program instructions that, when executed, cause one or more processors of an electronic device to perform operations comprising: detecting whether an external connector having multiple contact terminals is connected with a connector socket having a first contact terminal and a second contact terminal that are configured to electrically contact one of the contact terminals of the external connector, electrically connecting, when the external connector is connected with the connector socket, the first contact terminal to a first port of a codec circuit electrically connected with the connector socket through a first electrical path, electrically connecting the second contact terminal to a communication circuit through a second electrical path different from the first electrical path, and causing the communication circuit to receive a radio signal through the second electrical path.

* * * * *